United States Patent
Wang et al.

(10) Patent No.: US 8,279,365 B2
(45) Date of Patent: Oct. 2, 2012

(54) ACTIVE DEVICE ARRAY SUBSTRATE

(75) Inventors: Tsan-Chun Wang, Hsinchu (TW);
Yu-Cheng Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 257 days.

(21) Appl. No.: 12/814,503

(22) Filed: Jun. 14, 2010

(65) Prior Publication Data
US 2011/0273654 A1   Nov. 10, 2011

(30) Foreign Application Priority Data
May 4, 2010   (TW) .............................. 99114195 A

(51) Int. Cl.
*G02F 1/1343* (2006.01)
*G02F 1/136* (2006.01)
(52) U.S. Cl. .......................................... 349/38; 349/43
(58) Field of Classification Search .............. 349/38–43, 349/139, 143
See application file for complete search history.

(56) References Cited

U.S. PATENT DOCUMENTS

| 6,724,359 | B2 * | 4/2004 | Yamamoto et al. ............. 345/92 |
| 7,098,969 | B2 * | 8/2006 | Hashiguchi et al. ............ 349/43 |
| 7,612,839 | B2 | 11/2009 | Hisada |
| 2008/0111933 | A1 | 5/2008 | Lee et al. |

* cited by examiner

*Primary Examiner* — Dung T. Nguyen
(74) *Attorney, Agent, or Firm* — Jianq Chyun IP Office

(57) ABSTRACT

An active device array substrate includes a substrate, scan lines disposed on the substrate, data lines intersected with the scan lines, scan signal transmission lines, and pixel units. The scan signal transmission lines are intersected with the scan lines. Each scan signal transmission line connects one scan line through a node. The pixel unit electrically connects the corresponding data line and the corresponding scan line and includes an active device and a pixel electrode. The active device has a gate, a source, and a drain. The pixel electrode electrically connects the drain. In the pixel units not adjacent to the nodes, a gate-to-drain capacitance of each active device is Cgd1. In the pixel units adjacent to the nodes, the gate-to-drain capacitances of some active devices are Cgd2, the gate-to-drain capacitances of the other active devices are Cgd1, and Cgd1≠Cgd2.

17 Claims, 5 Drawing Sheets

ACTIVE DEVICE ARRAY SUBSTRATE

CROSS-REFERENCE TO RELATED APPLICATION

This application claims the priority benefit of Taiwan application serial no. 99114195, filed on May 4, 2010. The entirety of the above-mentioned patent application is hereby incorporated by reference herein and made a part of this specification.

BACKGROUND OF THE INVENTION

1. Field of the Invention

The present invention relates to an array substrate and particularly to an active device array substrate.

2. Description of Related Art

In general, a liquid crystal display (LCD) panel is mainly comprised of an active device array substrate, an opposite substrate, and a liquid crystal layer sandwiched between the active device array substrate and the opposite substrate. The active device array substrate has a display region and a non-display region. A plurality of pixel units arranged in an array are disposed in the display region, and each of the pixel units includes an active device and a pixel electrode connected to the active device. In addition, a plurality of scan lines and a plurality of data lines are disposed in the display region, and the active device in each of the pixel units is electrically connected to the corresponding scan line and the corresponding data line. By contrast, signal lines, source drivers, and gate drivers are disposed in the non-display region.

SUMMARY OF THE INVENTION

The present invention is directed to an active device array substrate characterized by satisfactory display quality.

In the present invention, an active device array substrate including a substrate, a plurality of scan lines, a plurality of data lines, a plurality of scan signal transmission lines, and a plurality of pixel units is provided. The scan lines are disposed on the substrate. The data lines are intersected with the scan lines. The scan signal transmission lines are intersected with the scan lines, and each of the scan signal transmission lines is connected to one of the scan lines through a node. Each of the pixel units is electrically connected to the corresponding data line and the corresponding scan line. Besides, each of the pixel units includes an active device and a pixel electrode. The active device has a gate, a source, and a drain. The pixel electrode is electrically connected to the drain. In the pixel units not adjacent to the nodes, a gate-to-drain capacitance of each of the active devices is Cgd1. In the pixel units adjacent to the nodes, the gate-to-drain capacitances of some of the active devices are Cgd2, the gate-to-drain capacitances of the other active devices are Cgd1, and Cgd1≠Cgd2.

In the present invention, another active device array substrate including a substrate, a plurality of scan lines, a plurality of data lines, a plurality of scan signal transmission lines, and a plurality of pixel units is provided. The scan lines are disposed on the substrate. The data lines are intersected with the scan lines. The scan signal transmission lines are intersected with the scan lines, and each of the scan signal transmission lines is connected to one of the scan lines through a node. Each of the pixel units is electrically connected to the corresponding data line and the corresponding scan line. Besides, each of the pixel units includes an active device and a pixel electrode. The active device has a gate, a source, and a drain. The pixel electrode is electrically connected to the active device. Gate-to-drain capacitances of some of the active devices are different from gate-to-drain capacitances of other active devices, such that a feed through level between any two pixel electrodes is substantially less than 0.03 volts.

In view of the above, the active devices in the pixel units are designed to have the different gate-to-drain capacitances based on locations of the pixel units in the present invention. Since the scan signal transmission lines generate different feed through effects on the pixel units, the difference between the feed through levels is compensated by the difference between the gate-to-drain capacitances. Thereby, electrical performance of the pixel units tends to be consistent, and satisfactory display quality of the active device array substrate can be further guaranteed.

In order to make the aforementioned and other features and advantages of the present invention more comprehensible, embodiments accompanying figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the present invention.

DESCRIPTION OF EMBODIMENTS

Figure 1:
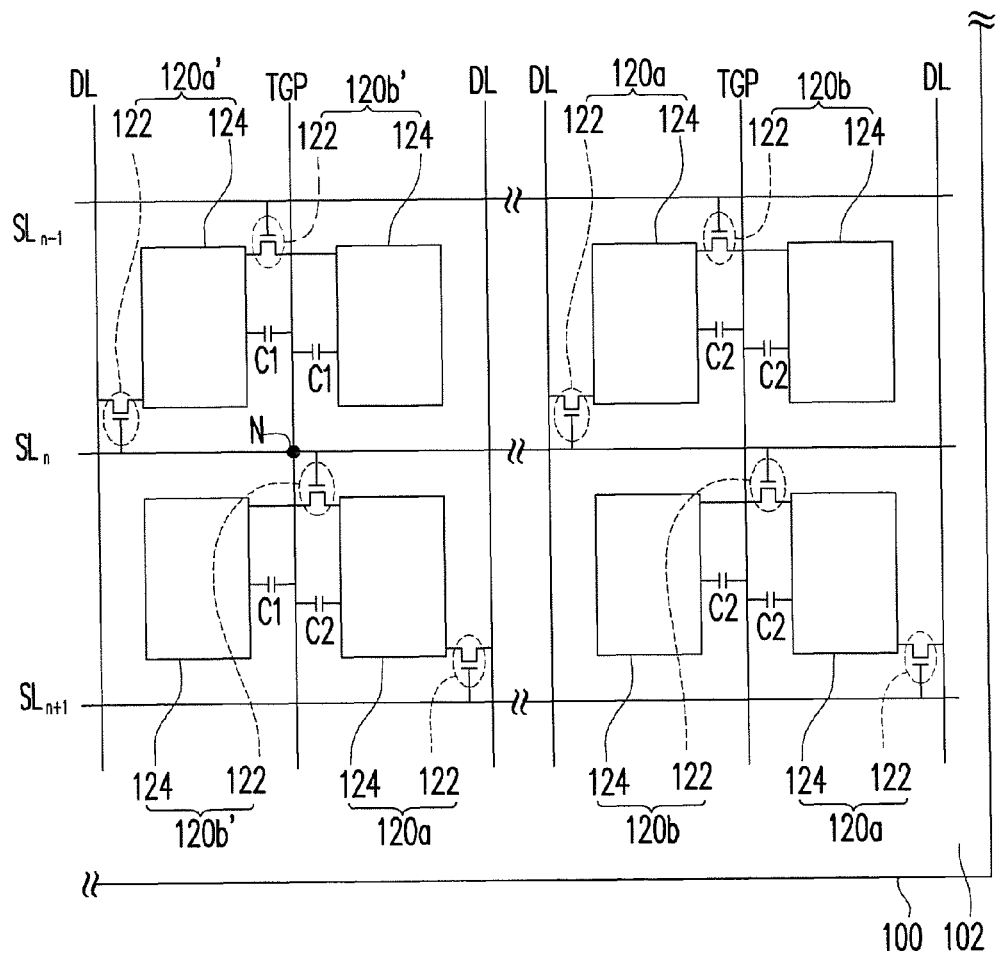
FIG. 1 is an equivalent circuit diagram schematically illustrating a half source driving (HSD) active device array substrate featuring a track-gate-line-in-pixel-area (TGP) wiring structure.

Before an active device array substrate of the present invention is described, different feed through effects generated on pixel units by scan signal transmission lines in an active device array substrate featuring a TGP wiring structure as shown in FIG. 1 are elaborated, which results in non-uniform display luminance of the active device array substrate. FIG. 1 is an equivalent circuit diagram schematically illustrating an HSD active device array substrate featuring a TGP wiring structure. As shown in FIG. 1, an active device array substrate 100 includes a substrate 102, a plurality of scan lines SL, a plurality of data lines DL, a plurality of scan signal transmission lines TGP, and a plurality of pixel units 120a, 120a', 120b, and 120b'. The scan lines SL are disposed on the substrate 102, and the data lines DL and the scan lines SL are intersected. The pixel units 120a, 120a', 120b, and 120b' are arranged in two columns between two adjacent data lines DL, and the pixel units 120a, 120a', 120b, and 120b' are electrically connected to the corresponding scan lines SL and the corresponding data lines DL, respectively. The scan signal transmission lines TGP and the scan lines SL are intersected, and each of the scan signal transmission lines TGP is disposed between two adjacent data lines DL, for example. Besides, each of the scan signal transmission lines TGP is connected to one of the scan lines SL through a node N, and the nodes N are arranged in a V shape (not shown) on the substrate 102, for example. Each of the pixel units 120a, 120a', 120b, and 120b' includes an active device 122 and a pixel electrode 124.

As shown in FIG. 1, when the pixel units 120a, 120a', and 120b' that are adjacent to the nodes N are driven, a lateral capacitance C1 is generated between each of the scan signal transmission lines TGP and the pixel electrode 124 of each of the pixel units 120a' and 120b', and a lateral capacitance C2 is generated between each of the scan signal transmission lines TGP and the pixel electrode 124 of each of the pixel units 120a. The lateral capacitance C1 is substantially equal to the lateral capacitance C2, for example. However, different feed through effects on the pixel units 120a, 120a', and 120b' are generated by the lateral capacitance C1 and C2. Generally, the feed through effects generated on the pixel units 120a' and 120b' by the scan signal transmission lines TGP are greater than the feed through effects generated on the pixel units 120a by the scan signal transmission lines TGP.

On the other hand, when the pixel units 120a and 120b that are not adjacent to the nodes N are driven, the lateral capacitance C2 is generated between each of the scan signal transmission lines TGP and the pixel electrode 124 of each of the pixel units 120a and 120b, and therefore the feed through effects generated on the pixel units 120a and 120b by the scan signal transmission lines TGP are relatively insignificant. Namely, different feed through effects are generated on the pixel units 120a, 120a', 120b, and 120b' by the scan signal transmission lines TGP, which results in non-uniform display luminance of the active device array substrate 100. To be more specific, when the nodes N are arranged in a V shape on the substrate 102, the V-shaped dark band or the V-shaped bright band is likely to be generated on the active device array substrate 100 during display, which further deteriorates the display quality of an LCD panel.

Accordingly, in the active device array substrate of the present invention, the difference between the feed through effects generated on the pixel units by the scan signal transmission lines is compensated by the difference between the gate-to-drain capacitances of the pixel units. Thereby, electrical performance of the pixel units adjacent or not adjacent to the nodes tends to be consistent, and satisfactory display quality of the active device array substrate can be further guaranteed.

Note that the pixel units not adjacent to the nodes are located between the scan lines $SL_{n-1}$ and $SL_{n+1}$ in the following embodiments as depicted in the drawings, while "the pixel units not adjacent to the nodes" herein refer to all of the pixel units that are not adjacent to the nodes in the active device array substrate rather than the pixel units between the scan lines $SL_{n-1}$ and $SL_{n+1}$. For illustrative purposes and convenience, only the pixel units not adjacent to the nodes between the scan lines $SL_{n-1}$ and $SL_{n+1}$ are shown in the drawings.

Figure 2A:
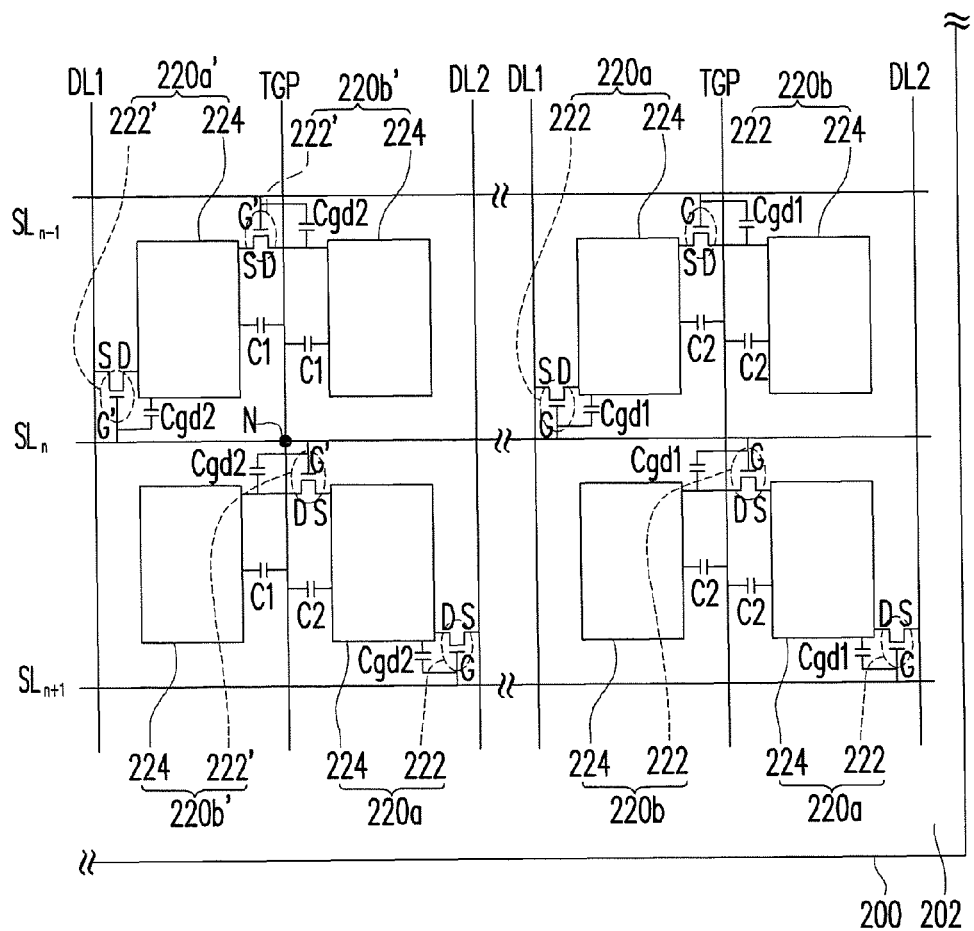
FIG. 2A is an equivalent circuit diagram schematically illustrating an active device array substrate according to an embodiment of the present invention.
Figure 2B:
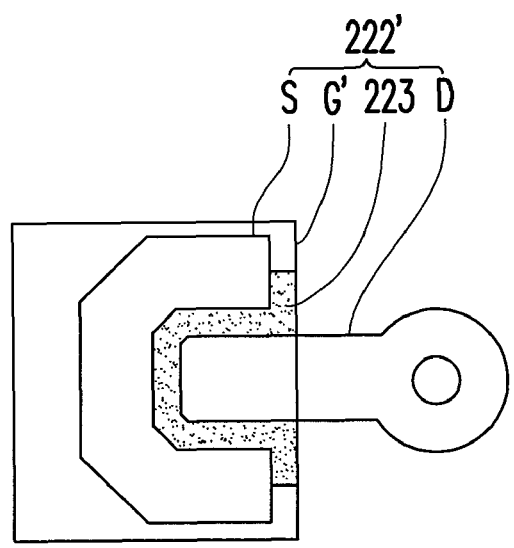
FIG. 2B is a schematic top view illustrating active devices 222' in pixel units 220a' and 220b' depicted in FIG. 2A.
Figure 2C:
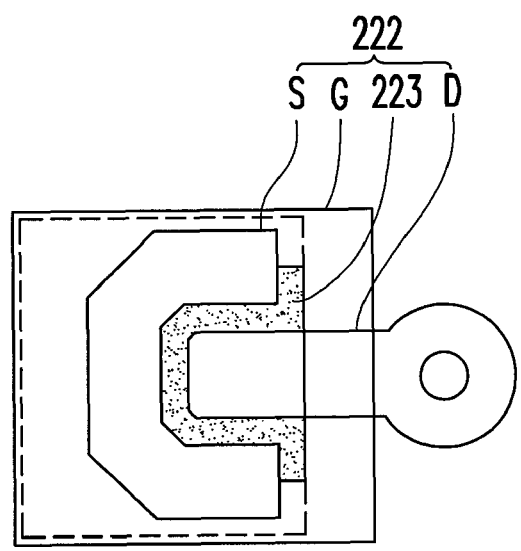
FIG. 2C is a schematic top view illustrating active devices 222 in pixel units 220a and 220b depicted in FIG. 2A.

FIG. 2A is an equivalent circuit diagram schematically illustrating an active device array substrate according to an embodiment of the present invention. FIG. 2B is a schematic top view illustrating active devices 222' in pixel units 220a' and 220b' depicted in FIG. 2A. FIG. 2C is a schematic top view illustrating active devices 222 in pixel units 220a and 220b depicted in FIG. 2A. As shown in FIG. 2A, an active device array substrate 200 is an HSD active device array substrate and includes a substrate 202, a plurality of scan lines $SL_{n-1}$, $SL_n$, and $SL_{n+1}$, a plurality of first data lines DL1, a plurality of second data lines DL2, a plurality of scan signal transmission lines TGP, a plurality of first pixel units 220a and 220a', and a plurality of second pixel units 220b and 220b'. The scan lines $SL_{n-1}$, $SL_n$, and $SL_{n+1}$ are disposed on the substrate 202 and are extended along a row direction, for example. The first data lines DL1 and the second data lines DL2 are alternately arranged and intersected with the scan lines $SL_{n-1}$, $SL_n$, and $SL_{n+1}$, for example, and the first data lines DL1 and the second data lines DL2 are extended along a column direction, for example. The scan signal transmission lines TGP and the scan lines $SL_{n-1}$, $SL_n$, and $SL_{n+1}$ are intersected, and each of the scan signal transmission lines TGP is disposed between two adjacent first data line DL1 and second data line DL2 and extended along the column direction, for example. Besides, each of the scan signal transmission lines TGP is connected to one of the scan lines $SL_{n-1}$, $SL_n$, and $SL_{n+1}$ through a node N, and the $n^{th}$ scan signal transmission line TGP, for instance, is connected to the $n^{th}$ scan line $SL_n$ through the $n^{th}$ node N.

In the present embodiment, the first pixel units 220a and 220a' and the second pixel units 220b and 220b' located between any two adjacent first data line DL1 and second data line DL2 are arranged in two columns, for example. In the column direction, the first pixel units 220a and 220a' arranged in even rows are aligned to the second pixel units 220b and 220b' arranged in odd rows, for example, and the first pixel units 220a and 220a' arranged in odd rows are aligned to the second pixel units 220b and 220b' arranged in even rows. The first pixel units 220a and 220a' are electrically connected to the corresponding scan lines $SL_{n-1}$, $SL_n$, and $SL_{n+1}$, the corresponding first data lines DL1, and the corresponding second data lines DL2. The second pixel units 220b and 220b' are electrically connected to the corresponding scan lines $SL_{n-1}$, $SL_n$, and $SL_{n+1}$. Besides, each of the second pixel units 220b and 220b' is electrically connected to one of the first data lines DL1 or one of the second data lines DL2 through one of the first pixels 220a and 220a', for example. Particularly, in the first pixel units 220a and 220a' and the second pixel units 220b' adjacent to the $n^{th}$ node N, one of the first pixel units 220a' located between the scan lines $SL_n$ and $SL_{n-1}$ is connected to the $n^{th}$ scan line $SL_n$ and one of the first data lines DL1; the other one of the first pixel units 220a that is adjacent to the $n^{th}$ node N and located between the scan lines $SL_{n+1}$ and $SL_n$ is connected to the (n+1)th scan line $S_{n+1}$ and one of the second data lines DL2; one of the second pixel units 220b' that is adjacent to the $n^{th}$ node N and located between the scan lines $SL_n$ and $SL_{n-1}$ is connected to the $(n-1)^{th}$ scan line $SL_{n-1}$ and is connected to the $n^{th}$ scan line $SL_n$ and one of the first data lines DL1 through the first pixel unit 220a'; the other one of the second pixel units 220b' that is adjacent to the $n^{th}$ node N and located between the scan lines $SL_{n+1}$ and $SL_n$ is connected to the $n^{th}$ scan line $SL_n$ and is connected to the $(n+1)^{th}$ scan line $SL_{n+1}$ and one of the second data lines D12 through the first pixel unit 220a.

Please refer to FIG. 2A. In the present embodiment, each of the first pixel units 220a and the second pixel units 220b includes an active device 222 and a pixel electrode 224, and each of the first pixel units 220a' and the second pixel units 220b' includes an active device 222' and a pixel electrode 224. Each of the active devices 222 has a gate G, a source S, a drain D, and a semiconductor layer 223 (as shown in FIG. 2B and FIG. 2C), and each of the active devices 222' has a gate G', a source S, a drain D, and a semiconductor layer 223 (as shown in FIG. 2B and FIG. 2C). The pixel electrode 124 is electrically connected to the drain D. In the pixel units 220a and 220b not adjacent to the nodes N, a gate-to-drain capacitance of each of the active devices 222 is Cgd1. In the pixel units 220a, 220a', and 220b' adjacent to the nodes N, the gate-to-drain capacitances of some of the active devices 222' (i.e. the active devices 222' of the pixel units 220a' and 220b') are Cgd2, the gate-to-drain capacitances of the other active devices 222 (i.e. the active devices 222 of the pixel units 220a) are Cgd1, and Cgd1≠Cgd2.

FIG. 2B and FIG. 2C are schematic top views respectively illustrating the active devices 222' in the pixel units 220a' and 220b' depicted in FIG. 2A and the active devices 222 in the pixel units 220a and 220b depicted in FIG. 2A. To clearly elucidate different patterns and different areas of the gates G and G', dotted lines in FIG. 2C represent the pattern and the area of the gate G' in FIG. 2B. With reference to FIG. 2A to FIG. 2C, in the pixel units 220a, 220a', and 220b' adjacent to the nodes N, the patterns and the areas of the drains D of the pixel units 220a, 220a', and 220b' are substantially the same, for example, and the patterns and the areas of the gates G of the pixel units 220a are greater than those of the gates G' of the pixel units 220a' and those of the gates G' of the pixel units 220b'. As such, in the pixel units 220a, 220a', and 220b' adjacent to the nodes N, the gate-to-drain capacitances Cgd1 exist between the gates G and the drains D of the pixel units 220a, the gate-to-drain capacitances Cgd2 exist between the gates G' and the drains D of the pixel units 220a', and the gate-to-drain capacitances Cgd2 exist between the gates G' and the drains D of the pixel units 220b'. Since the areas where the drains D and the gates G are overlapped are greater than the areas where the drains D and the gates G' are overlapped, for example, the gate-to-drain capacitances Cgd1 of the pixel units 220a are greater than the gate-to-drain capacitances Cgd2 of the pixel units 220a' and greater than the gate-to-drain capacitances Cgd2 of the pixel units 220b', i.e. Cgd2<Cgd1.

By contrast, with reference to FIG. 2A and FIG. 2C, in the pixel units 220a and 220b not adjacent to the nodes N, the pattern of the gate G in each of the pixel units 220a and 220b is substantially the same, the area of the gate G in each of the pixel units 220a and 220b is substantially the same, the pattern of the drain D in each of the pixel units 220a and 220b is substantially the same, and the area of the drain D in each of the pixel units 220a and 220b is substantially the same. Hence, in the pixel units 220a and 220b not adjacent to the nodes N, the gate-to-drain capacitance Cgd1 existing between the gate G and the drain D of each of the pixel units 220a and 220b is substantially the same. That is to say, the gate-to-drain capacitances Cgd1 in the pixel units 220a and 220b not adjacent to the nodes N are substantially equal to the gate-to-drain capacitances Cgd1 in some of the pixel units 220a adjacent to the nodes N, and the gate-to-drain capacitances Cgd1 are greater than the gate-to-drain capacitances Cgd2 in some of the pixel units 220a' and 220b' adjacent to the nodes N.

In the present embodiment, the drains D of the pixel units 220a and 220b have substantially the same pattern and the same area as those of the drains D' of the pixel units 220a' and 220b', while the patterns and the areas of the gates G of the pixel units 220a and 220b are different from those of the gates G' of the pixel units 220a' and 220b'. Any method for differentiating the gate-to-drain capacitances Cgd1 of the pixel units 220a and 220b from the gate-to-drain capacitances Cgd2 of the pixel units 220a' and 220b' is applicable in the present embodiment. For instance, in an embodiment not illustrated in the drawings, the gates G of the pixel units 220a and 220b are designed to have substantially the same pattern and the same area as those of the gates G' of the pixel units 220a' and 220b', while the patterns and the areas of the drains D of the pixel units 220a and 220b are designed to be different from those of the drains D' of the pixel units 220a' and 220b'. Thereby, since the areas where the drains D and the gates G in the pixel units 220a and 220b are overlapped are greater than the areas where the drains D' and the gates G' in the pixel units 220a' and 220b' are overlapped, for example, the gate-to-drain capacitances Cgd1 of the pixel units 220a and 220b are greater than the gate-to-drain capacitances Cgd2 of the pixel units 220a' and 220b'.

In the present embodiment, note that the gate-to-drain capacitances Cgd1 of some of the active devices 222 are different from the gate-to-drain capacitances Cgd2 of other active devices 222', such that a feed through level between any two pixel electrodes 224 in the pixel units 220a, 220a', 220b, and 220b' is substantially less than 0.03 volts. In most cases, the feed through level Vft=(Vgh−Vgl)×Cgd/$C_{total}$, wherein Vgh refers to a gate voltage when the active device is in an ON state, Vgl refers to a gate voltage when the active device is in an OFF state, Cgd refers to the gate-to-drain capacitance and is related to the area where the gate and the drain are overlapped, and $C_{total}$ refers to approximately the total of the liquid crystal capacitance $C_{LC}$, the storage capacitance Cst, the gate-to-drain capacitance Cgd, and the pixel-to-drain capacitance Cpd in the pixel unit.

Generally, based on the layout of the active device array substrate 200, when the pixel units 220a, 220a', and 220b' that are adjacent to the nodes N are driven, a lateral capacitance C1 is generated between each of the scan signal transmission lines TGP and the pixel electrode 224 of each of the pixel units 220a' and 220b', and a lateral capacitance C2 is generated between each of the scan signal transmission lines TGP and each of the pixel units 220a. The lateral capacitance C1 is substantially equal to the lateral capacitance C2 in most cases. On the other hand, when the pixel units 220a and 220b that are not adjacent to the nodes N are driven, the lateral capacitance C2 is generated between each of the scan signal transmission lines TGP and each of the pixel units 220a and 220b. Namely, different feed through effects on the pixel units 220a, 220a', 220b, and 220b' adjacent or not adjacent to the nodes N are generated by the scan signal transmission lines TGP, which is likely to deteriorate the display quality of the active device array substrate 200. Nonetheless, according to the present embodiment, the gate-to-drain capacitances Cgd1 in the pixel units 220a and 220b are designed to be greater than the gate-to-drain capacitances Cgd2 in the pixel units 220a' and 220b', and the difference between the gate-to-drain capacitance Cgd1 and the gate-to-drain capacitance Cgd2 is substantially equal to the difference between the feed through effects generated on the pixel units 220a, 220a', 220b, and 220b' by the lateral capacitance C1 and the feed through effects generated on the pixel units 220a, 220a', 220b, and 220b' by the lateral capacitance C2. Thereby, the difference between the feed through effects generated on the pixel units 220a and 220b by the lateral capacitances C1 and the feed through effects generated on the pixel units 220a' and 220b' by the lateral capacitances C2 can be compensated by the difference between the gate-to-drain capacitances Cgd1 in the pixel units 220a and 220b and the gate-to-drain capacitances Cgd2 in the pixel units 220a' and 220b'. That is to say, the difference between the feed through effects generated on the pixel units 220a, 220a', 220b, and 220b' by the scan signal transmission lines TGP can be compensated by the difference between the gate-to-drain capacitances Cgd1 and Cgd2 in the pixel units 220a, 220a', 220b, and 220b'. Thereby, electrical performance of the pixel units 220a, 220a', 220b, and 220b' tends to be consistent. As such, the distribution of the nodes N does not affect the image display of the active device array substrate 200, and the display defects including the V-shaped dark band or and the V-shaped bright band do not arise. In conclusion, satisfactory display quality of the active device array substrate 200 can be further guaranteed.

Figure 3:
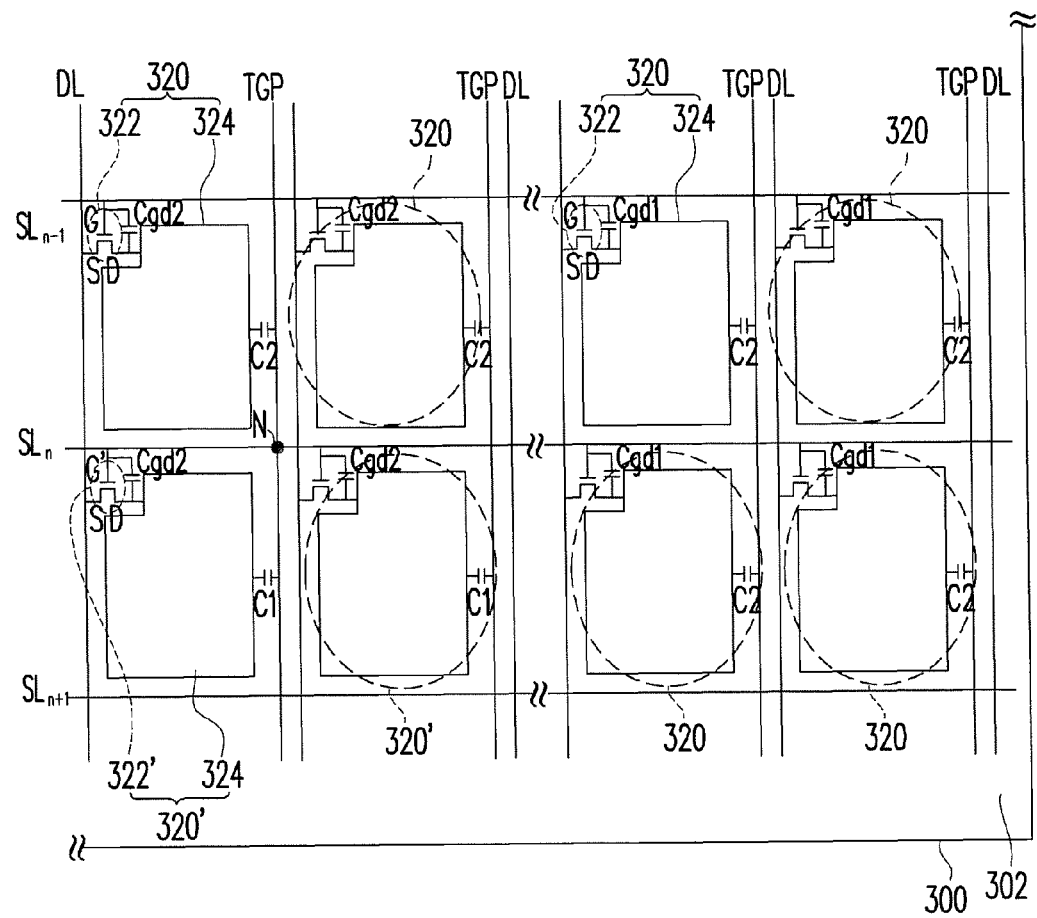
FIG. 3 is an equivalent circuit diagram schematically illustrating an active device array substrate according to another embodiment of the present invention.

It should be mentioned that the HSD active device array substrate 200 depicted in FIG. 2A is taken in the previous embodiment to elaborate the present invention, while the active device array substrate in other HSD forms or other active device array substrates are also applicable according to the present invention. FIG. 3 is an equivalent circuit diagram schematically illustrating an active device array substrate according to another embodiment of the present invention. As shown in FIG. 3, an active device array substrate 300 includes a substrate 302, a plurality of scan lines $SL_{n-1}$, $SL_n$, and $SL_{n+1}$, a plurality of data lines DL, a plurality of scan signal transmission lines TGP, and a plurality of pixel units 320 and 320'. The scan lines $SL_{n-1}$, $SL_n$, and $SL_{n+1}$ are disposed on the substrate 302, and the data lines DL and the scan lines $SL_{n-1}$, $SL_n$, and $SL_{n+1}$ are intersected. The scan signal transmission lines TGP and the scan lines $SL_{n-1}$, $SL_n$, and $SL_{n+1}$ are intersected, and each of the scan signal transmission lines TGP is located between two adjacent data lines DL, for example. Each of the scan signal transmission lines TGP is connected to one of the scan lines $SL_{n-1}$, $SL_n$, and $SL_{n+1}$ through a node N. In the present embodiment, the $n^{th}$ scan signal transmission line TGP, for instance, is connected to the $n^{th}$ scan line $SL_n$ through the $n^{th}$ node N, some of the pixel units 320' that are adjacent to the $n^{th}$ node N and located between the scan lines $SL_n$ and $SL_{n+1}$, for instance, are connected to the $n^{th}$ scan line $SL_n$, and the other pixel units 320 that are adjacent to the $n^{th}$ node N and located between the scan lines $SL_{n-1}$ and $SL_n$, for instance, are connected to the $(n-1)^{th}$ scan line $SL_{n-1}$.

In the present embodiment, each of the pixel units 320 includes an active device 322 and a pixel electrode 324, and each of the pixel units 320' includes an active device 322' and a pixel electrode 324. Each of the active devices 322 has a gate G, a source S, and a drain D, and each of the active devices 322' has a gate G', a source S, and a drain D. The pixel electrode 324 is electrically connected to the drain D. In the pixel units 320 not adjacent to the nodes N, a gate-to-drain capacitance of each of the active devices 322 is Cgd1. In the pixel units 320 and 320' adjacent to the nodes N, the gate-to-drain capacitances of some of the active devices 322' are Cgd2, the gate-to-drain capacitances of the other active devices 322 are Cgd1, and Cgd1≠Cgd2. That is to say, the active devices 322 in the pixel units 320 not adjacent to the nodes N all have the gate-to-drain capacitances Cgd1, and so do the active devices 322 in the pixel units 320 that are adjacent to the $n^{th}$ node N and connected to the $(n-1)^{th}$ scan line $SL_{n-1}$. By contrast, the active devices 322' in the pixel units 320' that are adjacent to the $n^{th}$ node N and connected to the $n^{th}$ scan line $SL_n$ have the gate-to-drain capacitances Cgd2.

According to the present embodiment, in the active devices 322 and 322', the patterns and the areas of the drains D are substantially the same, for example, and the patterns and the areas of the gates G are greater than those of the gate G', for example. As such, the gate-to-drain capacitances Cgd1 of the active devices 322 are greater than the gate-to-drain capacitances Cgd2 of the active devices 322'. Any method for differentiating the gate-to-drain capacitances Cgd1 of the pixel units 320 from the gate-to-drain capacitances Cgd2 of the pixel units 320' is applicable in the present embodiment. For instance, in an embodiment not illustrated in the drawings, the gates G and G' of the active devices 322 and 322' are designed to have substantially the same pattern and the same area, while the patterns and the areas of the drains D of the active devices 322 are designed to be greater than those of the drains D' of the active devices 322', such that the pixel units 320 and 320' have the different gate-to-drain capacitances Cgd1 and Cgd2. In an embodiment, note that the gate-to-drain capacitances Cgd1 of some of the active devices 322 are different from the gate-to-drain capacitances Cgd2 of other active devices 322', such that a feed through level between any two pixel electrodes 324 in the pixel units 320 and 320' is substantially less than 0.03 volts.

Generally, based on the layout of the active device array substrate 300, when the pixel units 320 and 320' that are adjacent to the nodes N are driven, a lateral capacitance C1 is generated between each of the scan signal transmission lines TGP and the pixel electrode 324 of each of the pixel units 320', and a lateral capacitance C2 is generated between each of the scan signal transmission lines TGP and each of the pixel units 320. The lateral capacitance C1 is substantially equal to the lateral capacitance C2 in most cases. On the other hand, when the pixel units 320 that are not adjacent to the nodes N are driven, the lateral capacitance C2 is generated between each of the scan signal transmission lines TGP and each of the pixel units 320. Namely, different feed through effects on the pixel units 320 and 320' are generated by the scan signal transmission lines TGP, which is likely to deteriorate the display quality of the active device array substrate 300.

Nonetheless, according to the present embodiment, the gate-to-drain capacitances Cgd1 in the pixel units 320 are designed to be greater than the gate-to-drain capacitances Cgd2 in the pixel units 320', and the difference between the gate-to-drain capacitance Cgd1 and the gate-to-drain capacitance Cgd2 is substantially equal to the difference between the feed through effect generated by the lateral capacitance C1 and the feed through effect generated by the lateral capacitance C2. Thereby, the difference between the feed through effects generated on the pixel units 320 by the lateral capacitances C2 and the feed through effects generated on the pixel units 320' by the lateral capacitances C1 can be compensated by the difference between the gate-to-drain capacitances Cgd1 in the pixel units 320 and the gate-to-drain capacitances Cgd2 in the pixel units 320', such that electrical performance of the pixel units 320 and 320' adjacent or not adjacent to the nodes N tends to be consistent. As such, the distribution of the nodes N is not apt to affect the image display of the active device array substrate 300, and the display defects including the V-shaped dark band or and the V-shaped bright band do not arise. In conclusion, satisfactory display quality of the active device array substrate 300 can be further guaranteed.

Figure 4:
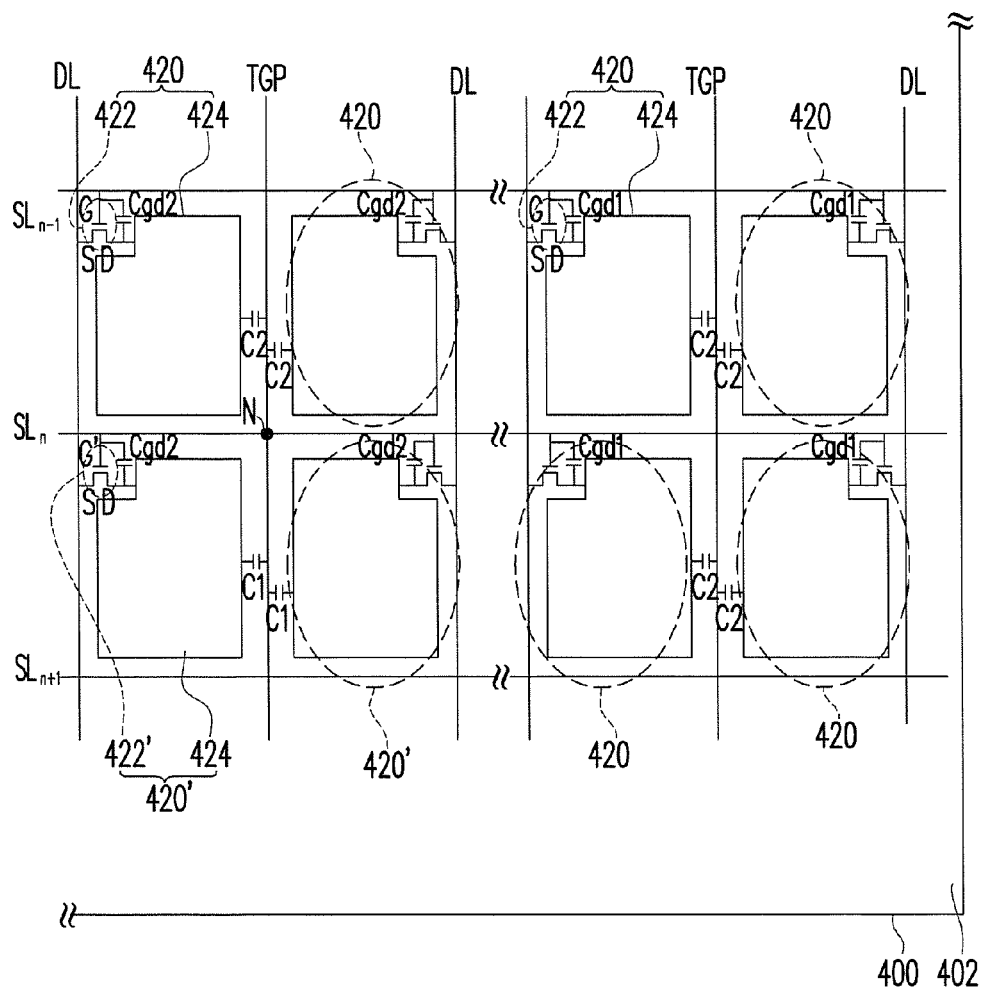
FIG. 4 is an equivalent circuit diagram schematically illustrating an active device array substrate according to another embodiment of the present invention.

FIG. 4 is an equivalent circuit diagram schematically illustrating an active device array substrate according to another embodiment of the present invention. As shown in FIG. 4, an active device array substrate 400 includes a substrate 402, a plurality of scan lines $SL_{n-1}$, $SL_n$, and $SL_{n+1}$, a plurality of data lines DL, a plurality of scan signal transmission lines TGP, and a plurality of pixel units 420 and 420'. The scan lines $SL_{n-1}$, $SL_n$, and $SL_{n+1}$ are disposed on the substrate 402, and the data lines DL and the scan lines $SL_{n-}$, $SL_n$, and $SL_{n+1}$ are intersected. The scan signal transmission lines TGP and the scan lines $SL_{n-1}$, $SL_n$, and $SL_{n+1}$ are intersected, and each of the scan signal transmission lines TGP is located between two adjacent data lines DL, for example. Each of the scan signal transmission lines TGP is connected to one of the scan lines $SL_{n-1}$, $SL_n$, and $SL_{n+1}$ through a node N. In the present embodiment, the $n^{th}$ scan signal transmission line TGP, for instance, is connected to the $n^{th}$ scan line $SL_n$ through the $n^{th}$ node N, some of the pixel units 420' that are adjacent to the $n^{th}$ node N and located between the scan lines $SL_n$ and $SL_{n+1}$, for instance, are connected to the $n^{th}$ scan line $SL_n$, and the other pixel units 420 that are adjacent to the $n^{th}$ node N and located between the scan lines $SL_{n-1}$ and $SL_n$, for instance, are connected to the $(n-1)^{th}$ scan line $SL_{n-1}$.

In the present embodiment, each of the pixel units 420 includes an active device 422 and a pixel electrode 424, and each of the pixel units 420' includes an active device 422' and a pixel electrode 424. Each of the active devices 422 has a gate G, a source S, and a drain D, and each of the active devices 422' has a gate G', a source S, and a drain D. The pixel electrode 424 is electrically connected to the drain D. In the pixel units 420 not adjacent to the nodes N, a gate-to-drain capacitance of each of the active devices 422 is Cgd1. In the pixel units 420 and 420' adjacent to the nodes N, the gate-to-drain capacitances of some of the active devices 422' are Cgd2, the gate-to-drain capacitances of the other active devices 422 are Cgd1, and Cgd1≠Cgd2. That is to say, the active devices 422 in the pixel units 420 not adjacent to the nodes N all have the gate-to-drain capacitances Cgd1, and so do the active devices 422 in the pixel units 420 that are adjacent to the $n^{th}$ node N and connected to the $(n-1)^{th}$ scan line $SL_{n-1}$. By contrast, the pixel units 420' that are adjacent to the $n^{th}$ node N and connected to the $n^{th}$ scan line $SL_n$ have the gate-to-drain capacitances Cgd2, and so do the active devices 422' in the pixel units 420' that are adjacent to the $n^{th}$ node N and connected to the $(n-1)^{th}$ scan line $SL_{n-1}$.

According to the present embodiment, in the active devices 422 and 422', the patterns and the areas of the drains D are substantially the same, for example, and the patterns and the areas of the gates G are greater than those of the gate G', for example. As such, the gate-to-drain capacitances Cgd1 of the active devices 422 are greater than the gate-to-drain capacitances Cgd2 of the active devices 422'. Any method for differentiating the gate-to-drain capacitances Cgd1 of the pixel units 420 from the gate-to-drain capacitances Cgd2 of the pixel units 420' is applicable in the present embodiment. For instance, in an embodiment not illustrated in the drawings, the gates G of the active devices 422 and 422' are designed to have substantially the same pattern and the same area, while the patterns and the areas of the drains D of the active devices 422 are designed to be greater than those of the drains D' of the active devices 422', such that the pixel units 420 and 420' have the different gate-to-drain capacitances Cgd1 and Cgd2. In an embodiment, note that the gate-to-drain capacitances Cgd1 of some of the active devices 422 are different from the gate-to-drain capacitances Cgd2 of other active devices 422', such that a feed through level between any two pixel electrodes 424 in the pixel units 420 and 420' is substantially less than 0.03 volts.

Generally, based on the layout of the active device array substrate 400, when the pixel units 420 and 420' that are adjacent to the nodes N are driven, a lateral capacitance C1 is generated between each of the scan signal transmission lines TGP and the pixel electrode 424 of each of the pixel units 420', and a lateral capacitance C2 is generated between each of the scan signal transmission lines TGP and each of the pixel units 420. The lateral capacitance C1 is substantially equal to the lateral capacitance C2 in most cases. On the other hand, when the pixel units 420 that are not adjacent to the nodes N are driven, the lateral capacitance C2 is generated between each of the scan signal transmission lines TGP and each of the pixel units 420. Namely, different feed through effects on the pixel units 420 and 420' are generated by the scan signal transmission lines TGP, which is likely to deteriorate the display quality of the active device array substrate 400. Nonetheless, according to the present embodiment, the gate-to-drain capacitances Cgd1 in the pixel units 420 are designed to be greater than the gate-to-drain capacitances Cgd2 in the pixel units 420', and the difference between the gate-to-drain capacitance Cgd1 and the gate-to-drain capacitance Cgd2 is substantially equal to the difference between the feed through effect generated by the lateral capacitance C1 and the feed through effect generated by the lateral capacitance C2. Thereby, the difference between the feed through effects generated on the pixel units 420' by the lateral capacitances C1 and the feed through effects generated on the pixel units 420 by the lateral capacitances C2 can be compensated by the difference between the gate-to-drain capacitances Cgd1 and Cgd2 in the pixel units 420 and 420', such that electrical performance of the pixel units 420 and 420' adjacent or not adjacent to the nodes N tends to be consistent. As such, the distribution of the nodes N is not apt to affect the image display of the active device array substrate 400, and the display defects including the V-shaped dark band or and the V-shaped bright band do not arise. In conclusion, satisfactory display quality of the active device array substrate 400 can be further guaranteed.

In light of the foregoing, the active devices in the pixel units are designed to have the different gate-to-drain capacitances based on locations of the pixel units in the present invention. Even though the scan signal transmission lines generate different feed through effects on the pixel units, the difference between the feed through effects can be compensated by the difference between the gate-to-drain capacitances. Thereby, electrical performance of the pixel units which are adjacent or not adjacent to the nodes tends to be consistent, and satisfactory display quality of the active device array substrate can be further guaranteed. Moreover, the present invention is directed to the active device array substrate featuring the TGP wiring structure; therefore, the frame area of the display panel employing the active device array substrate of the invention can be well embellished, and satisfactory display quality can be ensured.

Although the present invention has been described with reference to the above embodiments, it will be apparent to one of the ordinary skill in the art that modifications to the described embodiment may be made without departing from the spirit of the present invention. Accordingly, the scope of the invention will be defined by the attached claims not by the above detailed descriptions.

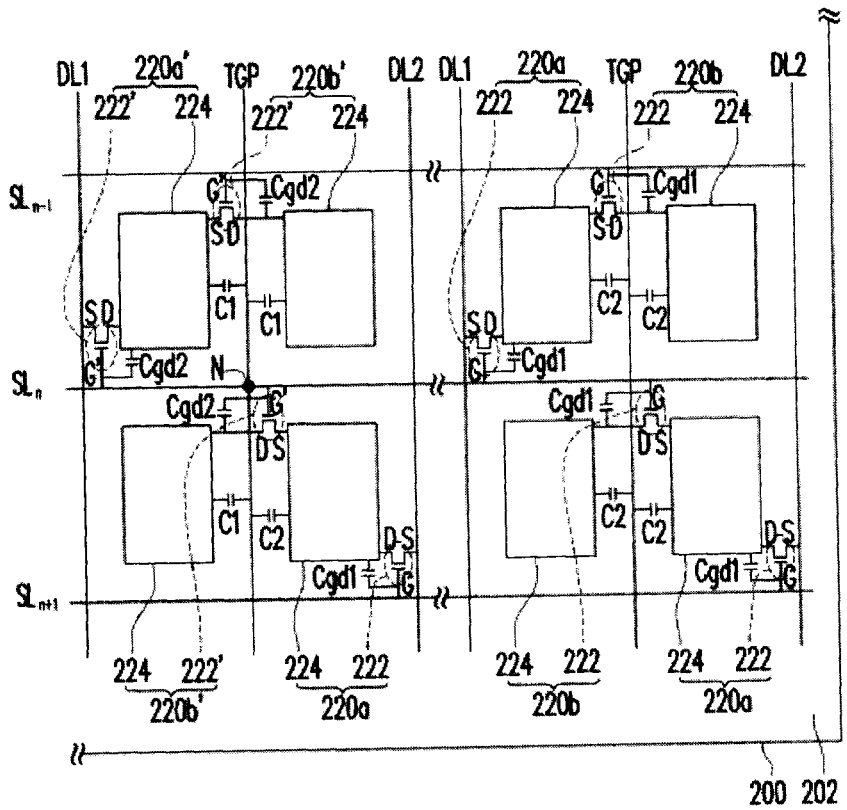

What is claimed is:

1. An active device array substrate comprising:
   a substrate;
   a plurality of scan lines disposed on the substrate;
   a plurality of data lines intersected with the scan lines;
   a plurality of scan signal transmission lines intersected with the scan lines, each of the scan signal transmission lines respectively connecting one of the scan lines through a node; and
   a plurality of pixel units electrically connected to one of the data lines and one of the scan lines correspondingly, each of the pixel units comprising:
      an active device having a gate, a source, and a drain; and
      a pixel electrode electrically connected to the drain, a gate-to-drain capacitance of each of the active devices in the pixel units not adjacent to the nodes being Cgd1, the gate-to-drain capacitances of parts of the active devices in the pixel units adjacent to the nodes being Cgd2, the gate-to-drain capacitances of the other parts of the active devices being Cgd1, wherein Cgd1≠Cgd2.

2. The active device array substrate as claimed in claim 1, wherein in the pixel units adjacent to the nodes, a pattern of each of the gates is substantially the same, an area of each of the gates is substantially the same, a pattern of each of the drains is not substantially the same, and an area of each of the drains is not substantially the same.

3. The active device array substrate as claimed in claim 1, wherein in the pixel units adjacent to the nodes, a pattern of each of the drains is substantially the same, an area of each of the drains is substantially the same, a pattern of each of the gates is not substantially the same, and an area of each of the gates is not substantially the same.

4. The active device array substrate as claimed in claim 1, wherein in the pixel units not adjacent to the nodes, a pattern of each of the gates is substantially the same, an area of each of the gates is substantially the same, a pattern of each of the drains is substantially the same, and an area of each of the drains is substantially the same.

5. The active device array substrate as claimed in claim 1, wherein the data lines comprise a plurality of first data lines and a plurality of second data lines alternately arranged, and the pixel units located between any two adjacent first data line and second data line of the first data lines and the second data lines are arranged in two columns.

6. The active device array substrate as claimed in claim 5, wherein the pixel units comprise a plurality of first pixel units and a plurality of second pixel units, and each of the second pixel units is electrically connected to one of the first data lines or one of the second data lines through one of the first pixel units.

7. The active device array substrate as claimed in claim 6, wherein in a column direction, the first pixel units located between any two adjacent first data line and second data line of the first data lines and the second data lines and arranged in even rows are aligned to the second pixel units arranged in odd rows, and the first pixel units arranged in odd rows are aligned to the second pixel units arranged in even rows.

8. The active device array substrate as claimed in claim 7, wherein an $n^{th}$ scan signal transmission line of the scan signal transmission lines is connected to an $n^{th}$ scan line of the scan lines through an $n^{th}$ node of the nodes, one of the first pixel units adjacent to the $n^{th}$ node is connected to the $n^{th}$ scan line and one of the first data lines, another one of the first pixel units adjacent to the $n^{th}$ node is connected to an $(n+1)^{th}$ scan line of the scan lines and one of the second data lines, one of the second pixel units adjacent to the $n^{th}$ node is connected to an $(n-1)^{th}$ scan line of the scan lines and is connected to the $n^{th}$ scan line and one of the first data lines through one of the first pixel units, and another one of the second pixel units adjacent to the $n^{th}$ node is connected to the $n^{th}$ scan line and is connected to the $(n+1)^{th}$ scan line and one of the second data lines through another one of the first pixel units.

9. The active device array substrate as claimed in claim 8, wherein in the another one of the first pixel units connected to the $(n+1)^{th}$ scan line and the one of the second data lines, a gate-to drain capacitance of the active device in the another one of the first pixel units is Cgd1.

10. The active device array substrate as claimed in claim 1, wherein an $n^{th}$ scan signal transmission line of the scan signal transmission lines is connected to an $n^{th}$ scan line of the scan lines through an $n^{th}$ node of the nodes, parts of the pixel units adjacent to the $n^{th}$ node are connected to the $n^{th}$ scan line, the other parts of the pixel units adjacent to the $n^{th}$ node are connected to an $(n-1)^{th}$ scan line of the scan lines or an $(n+1)^{th}$ scan line of the scan lines, and a gate-to-drain capacitance of the active device in one of the pixel units which is adjacent to the $n^{th}$ node and is connected to the $n^{th}$ scan line is Cgd2.

11. An active device array substrate comprising:
a substrate;
a plurality of scan lines disposed on the substrate;
a plurality of data lines intersected with the scan lines;
a plurality of scan signal transmission lines intersected with the scan lines, each of the scan signal transmission lines respectively connecting one of the scan lines through a node; and
a plurality of pixel units electrically connected to one of the data lines and one of the scan lines correspondingly, each of the pixel units comprising:
an active device having a gate, a source, and a drain; and
a pixel electrode electrically connected to the active device, wherein gate-to-drain capacitances of parts of the active devices are different from gate-to-drain capacitances of other parts of the active devices, such that a feed through level between any two pixel electrodes of the pixel electrodes is substantially less than 0.03 volts.

12. The active device array substrate as claimed in claim 11, wherein in the pixel units adjacent to the nodes, a pattern of each of the gates is substantially the same, an area of each of the gates is substantially the same, a pattern of each of the drains is not substantially the same, and an area of each of the drains is not substantially the same.

13. The active device array substrate as claimed in claim 11, wherein in the pixel units adjacent to the nodes, a pattern of each of the drains is substantially the same, an area of each of the drains is substantially the same, a pattern of each of the gates is not substantially the same, and an area of each of the gates is not substantially the same.

14. The active device array substrate as claimed in claim 11, wherein in the pixel units not adjacent to the nodes, a pattern of each of the gates is substantially the same, an area of each of the gates is substantially the same, a pattern of each of the drains is substantially the same, and an area of each of the drains is substantially the same.

15. The active device array substrate as claimed in claim 11, wherein the data lines comprise a plurality of first data lines and a plurality of second data lines alternately arranged, and the pixel units located between any two adjacent first data line and second data line of the first data lines and the second data lines are arranged in two columns.

16. The active device array substrate as claimed in claim 15, wherein the pixel units comprise a plurality of first pixel units and a plurality of second pixel units, and each of the second pixel units is electrically connected to one of the first data lines or one of the second data lines through one of the first pixel units, wherein in a column direction, the first pixel units located between any two adjacent first data line and second data line of the first data lines and the second data lines and arranged in even rows are aligned to the second pixel units arranged in odd rows, and the first pixel units arranged in odd rows are aligned to the second pixel units arranged in even rows, wherein an $n^{th}$ scan signal transmission line of the scan signal transmission lines is connected to an $n^{th}$ scan line of the scan lines through an $n^{th}$ node of the nodes, one of the first pixel units adjacent to the $n^{th}$ node is connected to the $n^{th}$ scan line and one of the first data lines, another one of the first pixel units adjacent to the $n^{th}$ node is connected to an $(n+1)^{th}$ scan line of the scan lines and one of the second data lines, one of the second pixel units adjacent to the $n^{th}$ node is connected to an $(n-1)^{th}$ scan line of the scan lines and is connected to the $n^{th}$ scan line and one of the first data lines through one of the first pixel units, and another one of the second pixel units adjacent to the $n^{th}$ node is connected to the $n^{th}$ scan line and is connected to the $(n+1)^{th}$ scan line and one of the second data lines through another one of the first pixel units, and wherein in the another one of the first pixel units connected to the $(n+1)^{th}$ scan line and the one of the second data lines, a gate-to-drain capacitance of the active device in the another one of the first pixel units is Cgd1.

17. The active device array substrate as claimed in claim 11, wherein an $n^{th}$ scan signal transmission line of the scan signal transmission lines is connected to an $n^{th}$ scan line of the scan lines through an $n^{th}$ node of the nodes, parts of the pixel units adjacent to the $n^{th}$ node are connected to the $n^{th}$ scan line, the other parts of the pixel units adjacent to the $n^{th}$ node are connected to an $(n-1)^{th}$ scan line of the scan lines or an $(n+1)^{th}$ scan line of the scan lines, and a gate-to-drain capacitance of the active device in one of the pixel units which is adjacent to the $n^{th}$ node and is connected to the $n^{th}$ scan line is Cgd2.

* * * * *

UNITED STATES PATENT AND TRADEMARK OFFICE
CERTIFICATE OF CORRECTION

PATENT NO. : 8,279,365 B2
APPLICATION NO. : 12/814503
DATED : October 2, 2012
INVENTOR(S) : Wang et al.

Page 1 of 2

It is certified that error appears in the above-identified patent and that said Letters Patent is hereby corrected as shown below:

The Title page, showing the illustrative figure, should be deleted and substitute therefor the attached Title page.

In the Drawings:

In Fig. 2A, in the pixel unit 220a on left, replace "Cgd2" with --Cgd1--.

In Fig. 3, --DL-- is applied to the data line element adjacent to the scan signal transmission lines TGP.

In Fig. 3, in the two pixel units 320 on left, replace "Cgd2" with --Cgd1--.

In Fig. 4, --DL-- is applied to the data line element adjacent to the scan signal transmission lines TGP.

In Fig. 4, in the two pixel units 420 on left, replace "Cgd2" with --Cgd1--.

Signed and Sealed this
Fifteenth Day of October, 2013

Teresa Stanek Rea
*Deputy Director of the United States Patent and Trademark Office*

(12) United States Patent
Wang et al.

(10) Patent No.: US 8,279,365 B2
(45) Date of Patent: Oct. 2, 2012

(54) ACTIVE DEVICE ARRAY SUBSTRATE

(75) Inventors: Tsan-Chun Wang, Hsinchu (TW); Yu-Cheng Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 257 days.

(21) Appl. No.: 12/814,503

(22) Filed: Jun. 14, 2010

(65) Prior Publication Data
US 2011/0273654 A1    Nov. 10, 2011

(30) Foreign Application Priority Data
May 4, 2010    (TW) .............................. 99114195 A

(51) Int. Cl.
*G02F 1/1343*    (2006.01)
*G02F 1/136*    (2006.01)
(52) U.S. Cl. .......................................... 349/38; 349/43
(58) Field of Classification Search .............. 349/38–43, 349/139, 143
See application file for complete search history.

(56) References Cited

U.S. PATENT DOCUMENTS

| | | | |
|---|---|---|---|
| 6,724,359 B2 * | 4/2004 | Yamamoto et al. | 345/92 |
| 7,098,969 B2 * | 8/2006 | Hashiguchi et al. | 349/43 |
| 7,612,839 B2 | 11/2009 | Hisada | |
| 2008/0111933 A1 | 5/2008 | Lee et al. | |

* cited by examiner

*Primary Examiner* — Dung T. Nguyen
(74) *Attorney, Agent, or Firm* — Jianq Chyun IP Office

(57) ABSTRACT

An active device array substrate includes a substrate, scan lines disposed on the substrate, data lines intersected with the scan lines, scan signal transmission lines, and pixel units. The scan signal transmission lines are intersected with the scan lines. Each scan signal transmission line connects one scan line through a node. The pixel unit electrically connects the corresponding data line and the corresponding scan line and includes an active device and a pixel electrode. The active device has a gate, a source, and a drain. The pixel electrode electrically connects the drain. In the pixel units not adjacent to the nodes, a gate-to-drain capacitance of each active device is Cgd1. In the pixel units adjacent to the nodes, the gate-to-drain capacitances of some active devices are Cgd2, the gate-to-drain capacitances of the other active devices are Cgd1, and Cgd1≠Cgd2.

17 Claims, 5 Drawing Sheets